(12) United States Patent
Murad et al.

(10) Patent No.: US 10,942,518 B2
(45) Date of Patent: Mar. 9, 2021

(54) SYSTEM AND METHOD FOR ASSISTING A VEHICLE TO PARK IN ALIGNMENT WITH A WIRELESS BATTERY CHARGING PAD

(71) Applicant: GM Global Technology Operations LLC, Detroit, MI (US)

(72) Inventors: Mohannad Murad, Troy, MI (US); Eugene F. Saltzberg, Highland, MI (US); Michael J. Bliss, Troy, MI (US); Apral S. Hara, Lasalle (CA); Junhua Tang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 16/217,411

(22) Filed: Dec. 12, 2018

(65) Prior Publication Data

US 2020/0192362 A1 Jun. 18, 2020

(51) Int. Cl.
| | | |
|---|---|---|
| *G01D 1/00* | (2006.01) | |
| *G05D 1/00* | (2006.01) | |
| *G05D 1/02* | (2020.01) | |
| *G01S 19/01* | (2010.01) | |
| *G08G 1/16* | (2006.01) | |
| *B60L 53/12* | (2019.01) | |

(52) U.S. Cl.
CPC ............ *G05D 1/0088* (2013.01); *B60L 53/12* (2019.02); *G01S 19/01* (2013.01); *G05D 1/0231* (2013.01); *G05D 1/0259* (2013.01); *G08G 1/168* (2013.01)

(58) Field of Classification Search
CPC .. G05D 1/0088; G05D 1/0231; G05D 1/0259; G01S 19/01; G08G 1/168; B60L 53/12
See application file for complete search history.

(56) References Cited

U.S. PATENT DOCUMENTS

| | | | | |
|---|---|---|---|---|
| 9,254,755 | B2* | 2/2016 | Bachmaier | ............ B60L 11/182 |
| 10,106,045 | B2* | 10/2018 | Beattie, Jr. | ............ B60L 53/305 |
| 10,239,414 | B2* | 3/2019 | Araki | ................. G01C 21/3617 |

(Continued)

OTHER PUBLICATIONS

Kiranmai Momidi, "Wireless Electric Vehicle Charging System (WEVCS)", published Jul. 12, 2019, all pages, retrieved from https://circuitdigest.com/article/wireless-electric-vehicle-charging-systems (Year: 2019).*

(Continued)

*Primary Examiner* — Calvin Cheung (57) ABSTRACT

A parking assist system and method for aligning a capture resonator mounted on a vehicle with a source resonator, charging pad, disposed on a ground surface is disclosed. The parking assist system includes a vehicle GPS receiver, a vehicle external sensor, an ultra-wide band (UWB) sensor, a controller; and a display device. The controller is configured to process information collected from the vehicle GPS receiver, the vehicle external sensor, and the UWB sensor to determine the location of the source resonator and to calculate a path to park the vehicle such that the capture resonator is aligned with the source resonator. A rendering of a trajectory path is displayed on a display device. The calculated path may be communicated to an autonomous driving system to autonomously maneuvering the vehicle into a parking space such that the capture resonator is aligned with the source resonator.

18 Claims, 6 Drawing Sheets

(56) References Cited

U.S. PATENT DOCUMENTS

| | | |
|---|---|---|
| 10,403,113 B1* | 9/2019 | Antar .................. B60L 53/12 |
| 10,710,466 B2* | 7/2020 | Kees .................. B60L 53/66 |
| 2004/0130463 A1* | 7/2004 | Bloomquist ..... G08G 1/096716 |
| | | 340/907 |
| 2013/0037339 A1 | 2/2013 | Hickox |
| 2014/0132207 A1* | 5/2014 | Fisher .................. H02J 50/90 |
| | | 320/108 |
| 2014/0132208 A1 | 5/2014 | Fisher |
| 2014/0285139 A1* | 9/2014 | Ahn .................. B60L 53/122 |
| | | 320/108 |
| 2016/0318407 A1* | 11/2016 | Borin .................. B60L 53/122 |
| 2018/0299900 A1* | 10/2018 | Bae .................. G06K 9/6202 |

OTHER PUBLICATIONS

Charles Morris, "Florida company files patent for wireless charging in parking lot wheel stops", published Nov. 28, 2012, all pages, retreived from https://chargedevs.conn/newswire/florida-company-files-patent-for-wireless-charging-in-parking-lot-wheel-stops/ (Year: 2012).*

* cited by examiner

FIG. 5B

SYSTEM AND METHOD FOR ASSISTING A VEHICLE TO PARK IN ALIGNMENT WITH A WIRELESS BATTERY CHARGING PAD

INTRODUCTION

The present disclosure relates to a vehicle having a wireless battery charging system, and more particularly to a system and method for assisting a vehicle to park in alignment with a wireless battery charging pad.

Electric motors in electric and hybrid vehicles are typically powered with rechargeable batteries disposed in a battery pack stored in a compartment of the vehicle. Typically, a charge-coupling device such as an electric plug is physically connected to the vehicle by a vehicle operator to recharge the batteries while the vehicle is parked. For the convenience of the vehicle operator, wireless charging systems were developed to eliminate the need to physically connect a charge-coupling device to the vehicle.

An example of a wireless battery charging system includes a charging pad disposed on a surface of a parking space under the vehicle being charged and a corresponding receiving plate mounted underneath the vehicle. The charging pad is a source resonator and the receiving plate is a capture resonator. The source resonator emits a magnetic charging signal that may be amplitude modulated. The charging signal is transmitted to the capture resonator wherein the charging signal induces an electric current. Such wireless battery charging systems are most efficient when the vehicle is parked such that the source resonator and the capture resonator are both laterally and longitudinally aligned with each other. The efficiency of such systems is further increased if the source resonator is in close proximity to the capture resonator.

However, as the source resonator and the capture resonator are both underneath the vehicle, it is difficult for the vehicle operator to determine where to maneuver the vehicle while parking such that the capture resonator on the vehicle is properly aligned with the source resonator underneath the vehicle. Thus, there is a need for a system and method to assist the vehicle operator to park the vehicle such that capture resonator mounted underneath the vehicle is aligned with the source resonator lying on top of the parking surface. There is still a further need to reduce the distance between the capture resonator and source resonator while the vehicle is in a charging state.

SUMMARY

According to several aspects, a vehicle having a parking assist system for aligning the vehicle with a source resonator of a wireless battery charging system is disclosed. The vehicle includes a global positioning system (GPS) receiver configured to collection satellite information to determine a location of the vehicle; a camera configured to capture an image of a ground surface proximal to the vehicle; and a capture resonator mounted on a lower portion of the vehicle, wherein the capture resonator is configured to wirelessly receive a magnetic charging signal emitted from the source resonator disposed on a surface of a parking space. The parking assist system includes a parking assist controller in electronic communications with at least one of the GPS receiver and the camera. The parking assist controller is configured to perform at least one of: (i) process the image captured by the camera based on a manual input, and (ii) automatically process the image when the source resonator is captured within the image by the camera; and calculate a path for navigating the vehicle into the parking space such that the capture resonator is aligned with the source resonator.

In an additional aspect of the present disclosure, the vehicle further includes ultra-wide band (UWB) sensors configured to triangulate the location of the source resonator. The parking assist controller is in communication with the UWB sensors and is further configured to analyze the signal from the UWB sensors to further define the calculated path.

In another aspect of the present disclosure, the parking assist controller initiate analysis of the detected magnetic charging signal when the vehicle is maneuvered over the source resonator such that the source resonator is out of a range of the camera.

In another aspect of the present disclosure, the vehicle further includes proximity sensors, such as ultra-sonic and/or UWB sensors, configured to collect information about a surrounding of the vehicle. The parking assist controller is in communication with the proximity sensor and is further configured to process the information collected by the proximity sensor to determine the distance of the source resonator from the vehicle based.

In another aspect of the present disclosure, the vehicle further includes a display screen located in a passenger cabin of the vehicle. The parking assist controller is further configured to send instructions to the display screen to render a diagrammatic top view of a transparent image of the vehicle, a capture resonator icon within the transparent image of the vehicle, and a source resonator icon relative to the transparent image of the vehicle.

In another aspect of the present disclosure, the parking assist controller is further configured to send navigation instructions to the display screen to render a trajectory path representing the calculated path.

In another aspect of the present disclosure, the parking assist controller is further configured to send instructions to the display screen to render the capture resonator icon in a first color when the capture icon is not overlapping the source resonator icon, and to render the capture resonator icon in a second color when the capture resonator icon is overlapping the source resonator icon.

In another aspect of the present disclosure, the vehicle further includes an autonomous drive system. The parking assist controller is further configured to send instructions to the autonomous drive system to drive the vehicle through the calculated path.

In another aspect of the present disclosure, the vehicle further includes a height adjustable suspension system. The parking assist controller is configured to send instructions to the height adjustable suspension system to lower the height of the vehicle when the capture resonator is aligned with the source resonator.

In another aspect of the present disclosure, the parking assist controller is configured to fuse the information collected from the GPS receiver, camera, UWB sensor, and proximity sensor to increase the confidence of the location of the source resonator relative to the capture resonator.

According to several aspects, a method of assisting a vehicle having a capture resonator to park in alignment with a wireless battery charging source resonator is disclosed. The method includes determining a location, by a GPS receiver, of the vehicle; calculating a distance between the determined location of the vehicle and a predetermined location of the source resonator; activating a camera to capture an image of an external ground surrounding of the vehicle when the calculated distance is less than a predetermined distance; and analyzing the image, by a parking assist controller, of the external surrounding of the vehicle to locate the source resonator relative to the vehicle's capture resonator and calculating an initial path to navigate the vehicle over the parking surface such that the capture resonator is aligned with the source resonator; and maneuvering the vehicle through the path.

In an additional aspect of the present disclosure, the method further includes activating ultra-wide band sensors to triangulate the location of the source resonator relative to the vehicle.

In another aspect of the present disclosure, when the source resonator is out of a field of vision of the camera; and after achieving good lateral alignment, the parking assist controller initiate analysis of the amplitude of the detected magnetic charging signal and use that in calculating a continued path to navigate the vehicle over the parking surface such that the capture resonator is aligned longitudinally with the source resonator.

In another aspect of the present disclosure, the method further includes determining whether the vehicle is in a parked gear when the vehicle capture resonator is aligned with the source resonator; and lowering the ground clearance of the vehicle when the vehicle is determined to be in a parked gear.

In another aspect of the present disclosure, the method of further includes rendering a display of, on a display device, a transparent vehicle having a capture resonator icon relative to a source resonator icon and guidelines representing the calculated initial and continued paths; and updating the rendered display as the vehicle is maneuvered through the calculated initial and continued path.

In another aspect of the present disclosure, the method further includes rendering the capture resonator icon in a first color when the capture resonator icon is not overlapping the source resonator icon, and rendering the capture resonator icon in a second color when the capture resonator icon is overlapping the source resonator icon.

In another aspect of the present disclosure, the method further includes communicating, by the controller, the calculated path to an autonomously drive system for autonomously maneuvering the vehicle into the parking space such that the capture resonator is aligned with the source resonator.

According to several aspects, a parking assist system for aligning a capture resonator mounted on a vehicle with a source resonator disposed on a ground surface of a parking space is disclosed. The parking assist system includes a vehicle GPS receiver configured to determine a location of the vehicle; a vehicle external sensor configured to collect information on a surrounding ground surface proximal to the vehicle; ultra-wide band (UWB) sensors configured to triangulate the position of the source resonator; and a parking assist controller in communications with the GPS receiver, vehicle external sensor, and UWB sensors. The parking assist controller is configured to: process information collected from the vehicle GPS receiver, the vehicle external sensor, and the UWB sensors to determine the location of the source resonator relative to the vehicle and calculate a path to maneuver the vehicle over the parking surface such that the capture resonator is aligned with the source resonator.

In an additional aspect of the present disclosure, the parking system further includes a display device in communication with the parking controller. The parking controller is further configured to send navigation instructions to the display device to render a trajectory path representing the calculated path to maneuver the vehicle over the parking surface such that the capture resonator is aligned over the source resonator.

In another aspect of the present disclosure, the parking system further includes an autonomous driving system. The parking controller is further configured to send instructions to the autonomous driving system to autonomously maneuver the vehicle into the parking space such that the capture resonator is aligned with the source resonator.

In another aspect of the present disclosure, the parking system further includes a height adjustable suspension system. The parking assist controller is configured to send instructions to the height adjustable suspension system to lower the height of the vehicle when the capture resonator is aligned with the source resonator.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
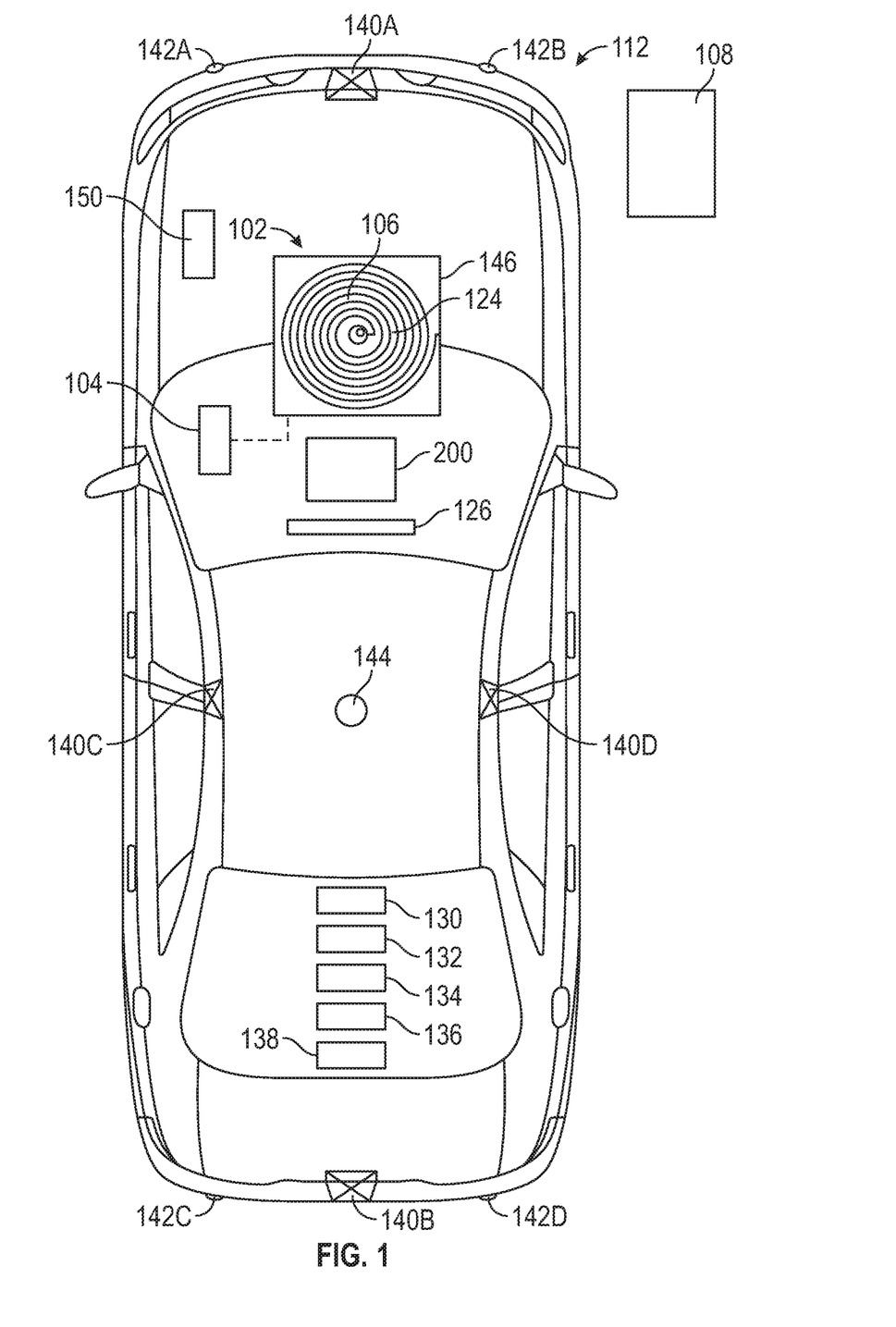
FIG. 1 is a diagrammatic top view of a vehicle having a parking assist system for aligning the vehicle with a wireless charging system, according to an exemplary embodiment.

FIG. 1 shows a diagrammatic top view of an electric or hybrid vehicle 100 having a wireless charging system 102 configured to recharge a battery pack 104 disposed within the vehicle 100. The wireless charging system 102 includes a capture resonator 106 mounted underneath the vehicle 100 and a source resonator 108 disposed on a ground surface 110 of a parking space 112. The parking surface may be inside a garage owned by the operator of the vehicle 100, or may be in a public parking lot that provides electric vehicle recharging services. For illustrative purposes, a passenger type motor vehicle is shown; however, the vehicle may be that of a truck, sport utility vehicle, van, motor home, or any other type of land based vehicle.

The source resonator 108 is electrically connected to a power supplier (not shown), such as a power grid, and is configured to emit a magnetic charging signal that may be amplitude modulated. The emitted magnetic charging signal is transmitted to the capture resonator 106 wherein the magnetic charging signal induces an electric current that is used to recharge the battery pack 104. The capture resonator 106 is mounted beneath the vehicle 100 proximal to the front of the vehicle 100. It should be appreciated that the capture resonator 106 may be located proximal to the rear or sides of the vehicle 100. The capture resonator 106 may be packaged inside of a housing (not shown) that is designed to isolate the capture resonator 106 from environmental factors such as dust, dirt, and moisture.

The vehicle 100 may be maneuvered to longitudinally and laterally align the capture resonator 106 with the source resonator 108 to provide maximum power transfer efficiency when the vehicle 100 is parked. Since the capture resonator 106 and the source resonator 108 are both underneath the vehicle 100, it may be difficult for the operator to maneuver the vehicle 100 to a position where the capture resonator 106 is both laterally and longitudinally aligned with source resonator 108. A parking assist system 200 is provided to guide the vehicle 100 into the parking space 112 such that the capture resonator 106 on the vehicle 100 is aligned with the source resonator 108 on the ground surface of the parking space 112.

Figure 2:
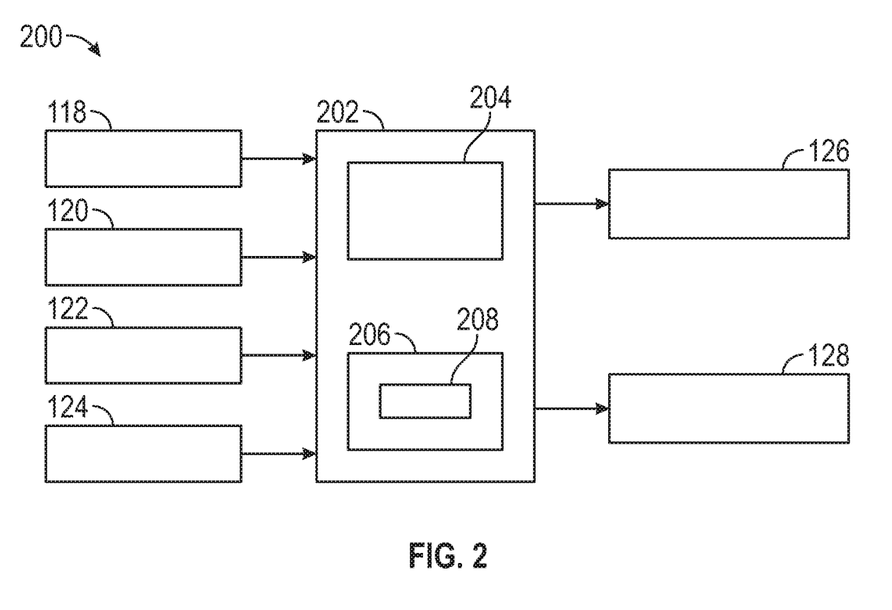
FIG. 2 is a functional schematic of the parking assist system for aligning the vehicle such that a capture resonator mounted underneath the vehicle is adjacent to a source resonator lying on the surface of a parking space, according to an exemplary embodiment.

FIG. 2 shows a schematic functional diagram of the parking assist system 200 for aligning the vehicle 100 such that the capture resonator 106 on the vehicle 100 is aligned with the source resonator 108 on the ground surface of the parking space 112, according to an exemplary embodiment. The parking assist system utilizes a parking assist controller 202, also referred to as controller 202, that receives and processes information from an onboard global positioning system (GPS) receiver 118, vehicle state sensors 120, vehicle external sensors 122, and an ultra-wideband (UWB) sensor 124 to calculate a path to maneuver the vehicle into the parking space 112 such that the capture resonator 106 is aligned with the source resonator 108. The controller 202 may communicate with a human machine interface (HMI) 126, such as a visual HMI display 126, to augment the operator's perception of the external surroundings of the vehicle 100 by rendering the calculated path in order to assist the vehicle 100 operator to properly maneuver the vehicle 100 into the parking space 112 such that the capture resonator 106 is aligned with the source resonator 108. The controller 202 may also generate commands for a partially or fully autonomous driving system 128, if so equipped, to autonomously maneuver the vehicle 100 into the parking space 112 such that the capture resonator 106 is aligned with the source resonator 108.

The parking assists controller 202 is a non-generalized, electronic control device having a preprogrammed digital computer or processor 204, memory or non-transitory computer readable medium 206 used to store data 208 such as control logic, instructions, image data, a digital map, lookup tables, etc., and a plurality of input/output peripherals or ports. The processor 204 is configured to execute the control logic or instructions. The information collected by the GPS receiver 118, vehicle state sensors 120, external sensors 122, and one or more UWB sensor 124 may be processed by the controller 202, a separate processor (not shown), and/or an application-specific integrated circuit (ASIC) designed for the specific type of GPS receiver 118, vehicle state sensors 120, external sensors 122, and UWB sensor 124. It should be appreciated that the ASIC processor may be built into the circuitry of the each of the GPS receiver 118, vehicle state sensors 120, external environment sensors 122, and UWB sensor 124.

Referring back to FIG. 1, the vehicle state sensors 120 collect information relating to the operating conditions of the vehicle 100 including a speed of the vehicle 100, a yaw rate of the vehicle 100, acceleration/deceleration information of the vehicle 100, brake activation information, and/or a steering angle of the vehicle 100. In one embodiment, the vehicle state sensors 120 may include, but not limited to, a speed sensor 130, an inertial measurement unit (IMU) 132, a transmission gear sensor 134, brake sensor 136, and a steering angle sensor 138. The vehicle state sensors 120 are mounted within or on the vehicle.

The vehicle external environmental sensors 122 are mounted to the vehicle 100 and generally include one or more devices operable to collect or sense information in a predefined area surrounding the vehicle 100. For example, in one aspect the vehicle external sensors 122 include imaging sensors 140 such as a forward facing camera 140A and a rearward facing camera 140B. Preferably, the forward and rearward cameras are mounted in a lower portion of the vehicle 100, such as the front grill and a rear panel in order to capture images of the ground surface proximal to the front and rear of the vehicle 100, respectively. The vehicle 100 may also include a left mounted camera 140C and a right mounted camera 140D configured to capture images of the ground surface proximal to the left and right sides of the vehicle 100, respectively. The images captured by the front, rear, left, and right cameras may be fused to provide 360 degrees of overlapping coverage. In another aspect, the vehicle 100 may include a plurality of proximity sensors 142A-142D such as radar or sonar sensors. In yet another aspect, the vehicle 100 may include a combination imaging and proximity sensor such as a Light Detection and Ranging (LIDAR) sensor 144. In still yet another aspect, the vehicle 100 may be equipped with the ultra-wideband (UWB) sensors 124 configured to triangulate the position of the source resonator 108 to align the capture resonator 106 with the source resonator 104.

The vehicle 100 may include a height adjustable suspension system 150 that allows the operator to adjust the ground clearance of the vehicle 100. The height adjustable suspension system may include hydraulic and/or pneumatic actuated shocks and/or springs to lower and rise the main body of the vehicle 100, including the floor pan of the vehicle 100 where the capture resonator 106 is mounted. The hydraulic/pneumatic actuated shocks/springs may be actuated by the parking assist controller 202 or the autonomous drive system.

Figure 3:
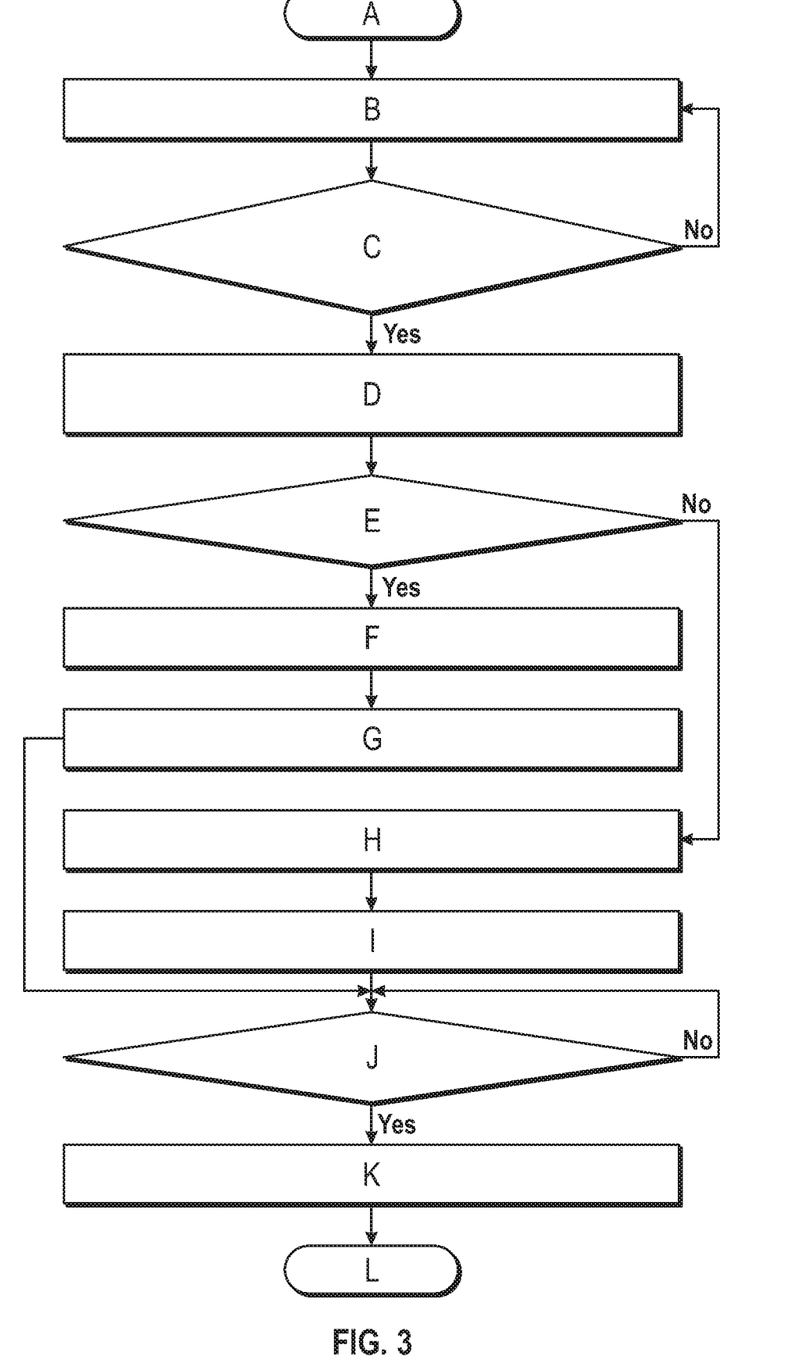
FIG. 3 is a flow chart of a method of using the parking assist system of FIG. 2 for aligning the capture resonator with the source resonator, according to an exemplary embodiment.

FIG. 3 shows a method of providing assist parking, generally indicated with reference number 300 (herein method 300). The method starts in Block A by positioning an end of the vehicle 100 proximal to the charge pad or source resonator 108. The end of the vehicle 100 may be of a forward end of the vehicle 100 or the rearward end of the vehicle 100.

In Block B the parking assist controller 202 receives the location, including the longitudinal and latitudinal coordinate, of the vehicle 100 from the GPS receiver 118. The parking assist controller 202 compares the location of the vehicle 100 with a stored predetermined location, including the longitudinal and latitude coordinates, of the source resonator 108. When the parking assist controller 202 determines the vehicle 100 is within a predetermined distance from the source resonator 108 based on the GPS data, the parking assist controller 202 activates one or more of the imaging sensors 140, proximity sensors 142, LIDAR 144, and UWB sensor 124.

In Block C, the parking assist controller 202 collects and processes information received from the activated one or more of the imaging sensors 140, proximity sensors 142, LIDAR 144, and UWB sensor 124 to locate the source resonator 108 with respect to the capture resonator 106 and to identify obstacles, if any, between the vehicle 100 and the source resonator 108. If the source resonator 108 is not located, the method then returns to Block B. If the source resonator 108 is located, the parking assist controller 202 then calculates an efficient path of travel to maneuver or navigate the vehicle 100 around any identified obstacles into the parking space 112 such that the capture resonator 106 mounted on the vehicle 100 is aligned with source resonator 108 on the ground surface of the parking space 112.

The information collected from each of the sensors may be fused by the parking assist controller 202 to increase the confidence of the location of the source resonator 108 with respect to the capture resonator 106. Certain sensors may be activated simultaneously and other sensors may be activated sequentially. For example, the imaging sensors 140 may be first activated, then as the vehicle 100 is maneuvered near the source resonator 108, the proximity sensors 142 may be activated to increase the confidence of location of the source resonator 108. Once the vehicle 100 is maneuvered adjacent to or over the source resonator 108, and an acceptable lateral alignment is achieved based on data from the imaging sensors, then the parking assist controller can monitor and analyze the amplitude of the electrical signal from the collector coil or resonator and use that as a method to monitor for when a longitudinal alignment occur as the amplitude need to reach a certain peak before the controller is assured that the alignment occurred. The UWB sensor 124 may also be used to guide the vehicle 100 in the parking space 112 such that the capture resonator 106 on the vehicle 100 is aligned with the source resonator 108 on the ground surface.

In Block D, the parking assist controller 202 generates graphic information that is rendered on the HMI display 126 device to assist the vehicle operator in guiding the vehicle 100. The display device may include an Organic Light Emitting Diode (OLED) display, a liquid crystal display (LCD), a light emitting diode (LED) display, a plasma display, or any other suitable display. The display device may be located inside the vehicle 100 in a location visible to a vehicle operator, such as the vehicle center stack. The display device may be part of another display system, for example a vehicle navigation display or audio system display or even an external device such as a personal phone or iPad where the driver can maneuver their vehicle remotely.

In Block E, the controller 202 presents an option that may be presented on the display device that allows the operator to give partial or full control to the vehicle's autonomous driving system 128 to maneuver the vehicle 100 into position, if the vehicle 100 is so equipped with an autonomous drive unit.

In Block F, if the operator elects to give control to the vehicle autonomous driving system, the controller 202 processes information received from the camera, UWB, capture resonator 106 signal output, and vehicle state sensors 120 to generate instructions for the autonomous drive system 128 to maneuver the vehicle 100 into position. In Block G, once the vehicle 100 is maneuvered sufficient adjacent the source resonator 108, such that the vehicle 100 camera no longer captures the image of the source resonator 108, the controller 202 process the information received from the IMU 132, UWB sensor 124, and the capture resonator 106 signal output to estimate the location of the source resonator 108. To increase the confidence of the location of the source resonator 108 relative to the capture resonator 106, the information from the GPS receiver 118, IMU 132, UWB sensor 124, and the capture resonator signal output may be fused.

In Bock H, if the operator elects to retain direct control of the vehicle 100, the controller 202 processes the information received from the GPS receiver 118, vehicle state sensors 120, external sensors 122, UWB sensor 124, and the capture resonator signal output to generate graphical information that is rendered on the HMI display 126 device to assist the vehicle operator in maneuvering the vehicle 100. The path of travel may be displayed as trajectory guidelines 408 (shown in FIG. 4A) highlighting the path of travel that is the most efficient for the vehicle 100 to maneuver into the parking space 112 such that the capture resonator 106 and source resonator 108 is aligned. The path of travel may be continuously updated as the vehicle 100 is maneuvered thus providing a dynamic trajectory guideline 408.

In Block I, once the vehicle 100 is maneuvered sufficiently adjacent the source resonator 108, such that the vehicle camera no longer captures the image of the source resonator 108, the controller 202 process the information received from the IMU 132, UWB sensor 124, and the capture resonator signal output to estimate the location of the source resonator 108 in order to continuingly generate dynamic trajectory guideline 408 to assist the operator in maneuvering the vehicle 100.

In block J, once the controller 202 detects the capture resonator 106 is within a predetermined range of the source resonator 108, the controller 202 processes the vehicle state information collected from the vehicle state sensors 120 to determine if the vehicle 100 is in a stationary state. If the vehicle 100 is in a stationary state, the controller 202 receives information from the transmission gear sensor 134 to determine if the transmission is in park.

Figure 5A:
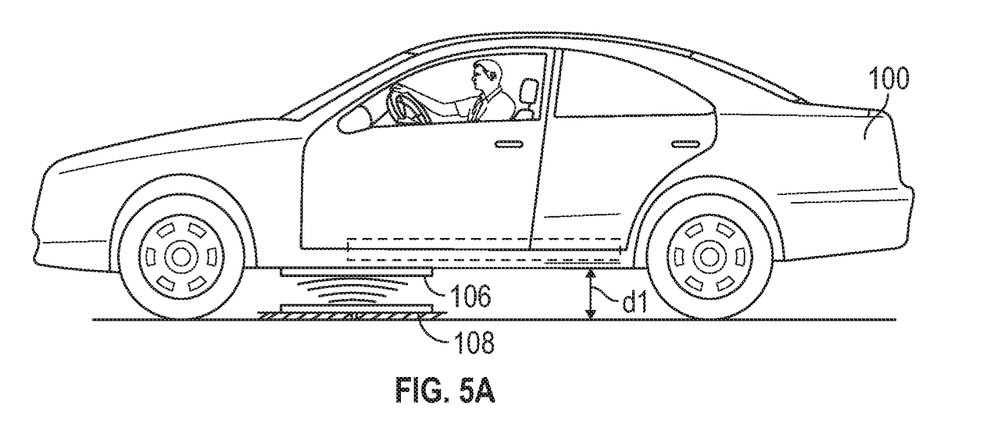
FIG. 5A-5B is a diagrammatic side view of the vehicle as the vehicle is lowered into position once the capture resonator is aligned with the source resonator, according to an exemplary embodiment.
Figure 5B:
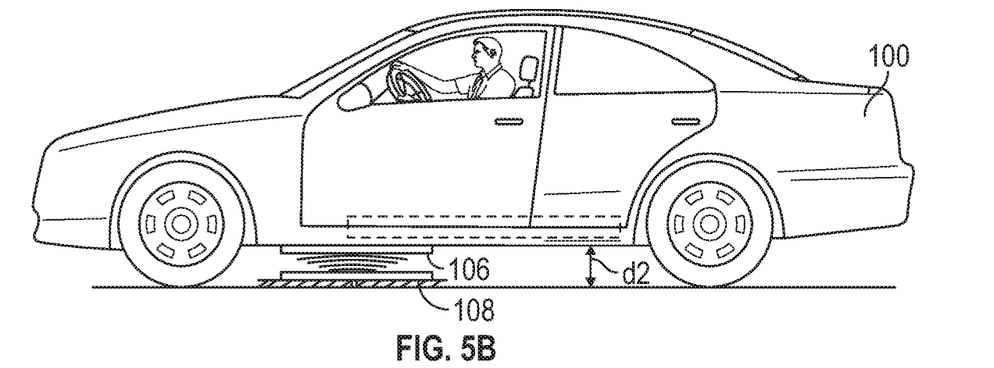

In Block K, if the controller 202 determines the vehicle 100 is within the predetermined range, preferably on top, of the source resonator 108 and the transmission is in park, the controller 202 instructs the autonomous drive system to lower the vehicle 100 to vertically reduce the distance, or ground clearance, between the capture resonator 106 and source resonator 108 from a first distance (d1) to second distance (d2) as shown in FIG. 5A-5B. The method ends in Block L, when the vehicle 100 is lowered.

Figure 4A:
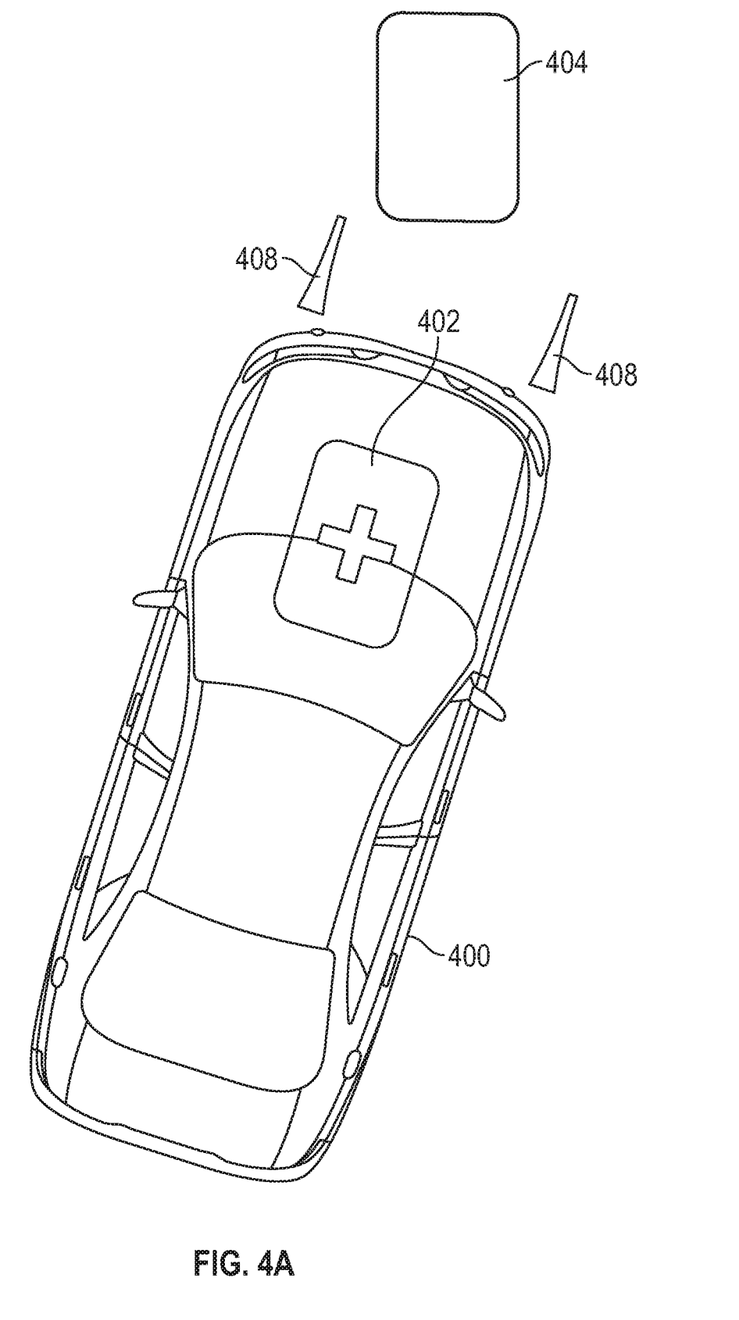
FIG. 4A-4C is a diagrammatic top view of the vehicle as the parking assist system is guiding the vehicle into a parking position such that the capture resonator is aligned with the source resonator, according to an exemplary embodiment.
Figure 4B:
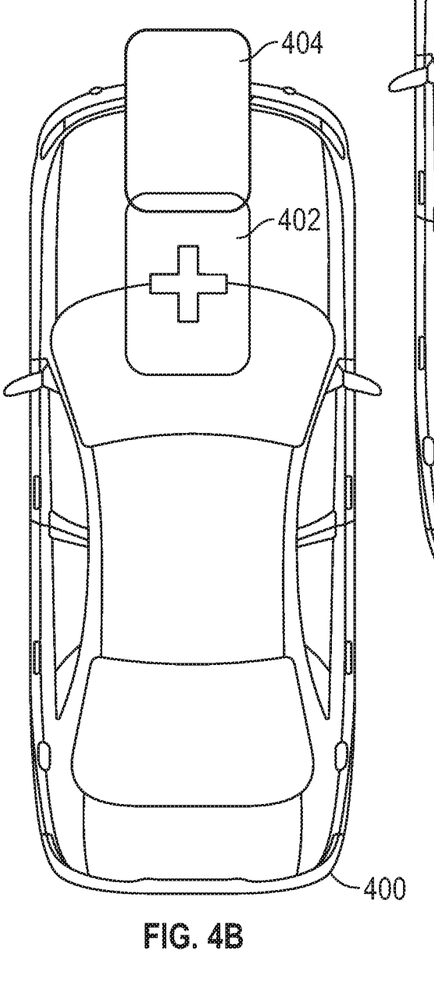
Figure 4C:
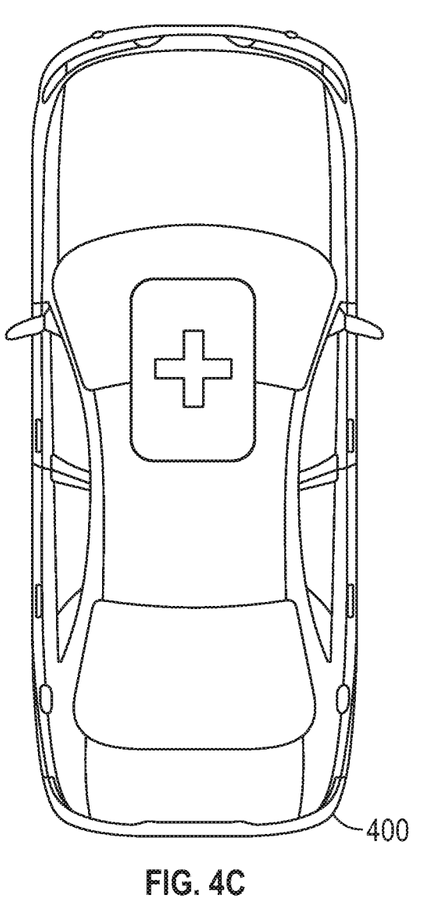

Referring to FIGS. 4A though 4C, is exemplary illustration of an overhead view of an outline of a transparent vehicle 400 that may be rendered on the HMI display device 126. The transparent vehicle 400 includes a capture resonator icon 402. The graphical information also includes a source resonator icon 404 positioned relative to the transparent vehicle 400. The capture resonator icon 402 may be highlighted in one color, such as red, to represent that the capture resonator 106 is not in alignment with the source resonator 108. The capture resonator icon 402 may include a symbol such as a Plus (+) sign. Once the capture resonator 106 is aligned with the source resonator 108, the capture resonator icon 402 may be highlighted in a second color, such as green.

FIG. 5A shows a side view of the vehicle 100 aligned with the source resonator 108 in a stationary parked position. FIG. 5B shows the vehicle 100 as the ride height adjustment is lowered so that the distance between the capture resonator 106 and source resonator 108 is reduced. The side view of vehicle 100 as shown in FIGS. 5A and 5B may be rendered on the display unit.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle having a parking assist system for aligning the vehicle with a source resonator of a wireless battery charging system, the vehicle comprising:
    a global positioning system (GPS) receiver configured to collection satellite information to determine a location of the vehicle;
    a camera configured to capture an image of a ground surface proximal to the vehicle;
    a capture resonator mounted on a lower portion of the vehicle, wherein the capture resonator is configured to wirelessly receive a magnetic charging signal emitted from the source resonator disposed on a surface of a parking space; and
    at least one ultra-wide band (UWB) sensor configured to triangulate a position of the source resonator;
    wherein the parking assist system includes a parking assist controller in electronic communications with at least one of the GPS receiver and the camera,
    wherein the parking assist controller is configured to perform at least one of: (i) process the image captured by the camera based on a manual input, and (ii) automatically process the image when the source resonator is captured within the image by the camera; and calculate a path for navigating the vehicle into the parking space such that the capture resonator is aligned with the source resonator;
    wherein the parking assist controller is in communication with the UWB sensor and is further configured to define the calculated path based on the triangulated position of the source resonator.

2. The vehicle of claim 1, wherein the parking assist controller is configured to process GPS information to calculate a distance between the location of the vehicle and a predetermined location of the source resonator, and to process the image captured by the camera when the calculated distance between the vehicle and the source resonator is less than a predetermined value.

3. The vehicle of claim 2, further comprising a proximity sensor configured to collect information about a surrounding of the vehicle;
    wherein the parking assist controller is in communication with the proximity sensor and is further configured to process the information collected by the proximity sensor to determine a distance of the source resonator from the vehicle.

4. The vehicle of claim 3, wherein the parking assist controller is configured to fuse information collected from the GPS receiver, camera, UWB sensor, and proximity sensor to increase the confidence of the location of the source resonator relative to the capture resonator.

5. The vehicle of claim 2 further comprising:
    a human machine interface (HMI) display screen located in a passenger cabin of the vehicle;
    wherein the parking assist controller is further configured to send instructions to the HMI display screen to render a diagrammatic top view of a transparent image of the vehicle, a capture resonator icon within the transparent image of the vehicle, and a source resonator icon relative to the transparent image of the vehicle.

6. The vehicle of claim 5, wherein the parking assist controller is further configured to render a trajectory path representing the calculated path on the HMI display screen.

7. The vehicle of claim 6, wherein the parking assist controller is further configured to render the capture resonator icon in a first color when the capture resonator icon is not overlapping the source resonator icon, and to render the capture resonator icon in a second color when the capture resonator icon is overlapping the source resonator icon.

8. The vehicle of claim 7, further comprising an autonomous drive system;
    wherein the parking assist controller is further configured to send instructions to the autonomous drive system to maneuver the vehicle through the calculated path.

9. The vehicle of claim 8, further comprising a height adjustable suspension system;
    wherein the parking assist controller is configured to send instructions to the height adjustable suspension system to lower the height of the vehicle when the capture resonator is aligned with the source resonator.

10. A method of assisting a vehicle having a capture resonator to park in alignment with a source resonator, the method comprising:
    determining a location, by a GPS, of the vehicle;
    calculating a distance between the determined location of the vehicle and a predetermined location of the source resonator;
    activating a camera to capture an image of an external surrounding of the vehicle when the calculated distance is less than a predetermined distance;
    analyzing the image, by a parking assist controller, of the external surrounding of the vehicle to locate the source resonator relative to the vehicle and calculating an initial path to navigate the vehicle over a parking surface such that the capture resonator is aligned with the source resonator;
    activating at least one ultra-wide band (UWB) sensor to locate the source resonator relative to the vehicle when the source resonator is out of a field of vision of the camera; and
    calculating a continued path, by the parking assist controller, to navigate the vehicle over the parking surface such that the capture resonator is aligned with the source resonator.

11. The method of claim 10, further comprises:
    determining whether the vehicle is in a parked gear when the vehicle capture resonator is aligned with the source resonator; and
    lowering a ground clearance of the vehicle when the vehicle is determined to be in a parked gear.

12. The method of claim 11, further comprises:
    rendering a display of, on a display device, a transparent vehicle having a capture resonator icon relative to a source resonator icon and a trajectory guideline representing the calculated initial and continued paths; and
    updating the rendered display as the vehicle is maneuvered through the calculated initial and continued path.

13. The method of claim 12, further comprises:
rendering the capture resonator icon in a first color when the capture resonator icon is not overlapping the source resonator icon, and rendering the capture resonator icon in a second color when the capture resonator icon is overlapping the source resonator icon.

14. The method of claim 13, further comprises:
communicating, by the controller, the calculated path to an autonomously drive system for autonomously maneuvering the vehicle into a parking space such that the capture resonator is aligned with the source resonator.

15. A parking assist system for aligning a capture resonator mounted on a vehicle with a source resonator disposed on a ground surface of a parking space, the parking assist system comprising:
   a vehicle GPS receiver configured to collect satellite information to determine a location of the vehicle;
   a vehicle external sensor configured to collect external environment information on a surrounding ground surface proximal to the vehicle;
   at least one ultra-wide band (UWB) sensor configured to triangulate a position of the source resonator; and
   a parking assist controller configured to:
      process the information collected from the vehicle GPS receiver, the vehicle external sensor, and the at least one UWB sensor to determine the location of the source resonator relative to the vehicle; and
      calculate a path to maneuver the vehicle over the parking space such that the capture resonator is aligned with the source resonator.

16. The parking system of claim 15, further comprising:
   a display device in communication with the parking controller;
   wherein the parking controller is further configured to send navigation instructions to the display device to render a trajectory path representing the calculated path to maneuver the vehicle over the parking space such that the capture resonator is aligned over the source resonator.

17. The parking system of claim 16, further comprising a height adjustable suspension system;
   wherein the parking assist controller is configured send instructions to the height adjustable suspension system to lower a height of the vehicle when the capture resonator is aligned with the source resonator.

18. The parking system of claim 15, further comprising:
   an autonomous driving system;
   wherein the parking controller is further configured send instructions to the autonomous driving system to autonomously maneuvering the vehicle into the parking space such that the capture resonator is aligned with the source resonator.

* * * * *